Sept. 8, 1964  C. F. OSGOOD  3,147,959
ROTARY CORE CUTTING HEAD MECHANISM FOR BORE MINER
Filed March 5, 1962  3 Sheets-Sheet 1

INVENTOR:
Charles F. Osgood

Sept. 8, 1964  C. F. OSGOOD  3,147,959
ROTARY CORE CUTTING HEAD MECHANISM FOR BORE MINER
Filed March 5, 1962  3 Sheets-Sheet 2

INVENTOR:
Charles F. Osgood.

Sept. 8, 1964 C. F. OSGOOD 3,147,959
ROTARY CORE CUTTING HEAD MECHANISM FOR BORE MINER
Filed March 5, 1962 3 Sheets-Sheet 3

INVENTOR:
Charles F. Osgood

United States Patent Office 3,147,959
Patented Sept. 8, 1964

3,147,959
ROTARY CORE CUTTING HEAD MECHANISM
FOR BORE MINER
Charles F. Osgood, Franklin, Pa., assignor to Joy Manufacturing Company, Pittsburgh, Pa., a corporation of Pennsylvania
Filed Mar. 5, 1962, Ser. No. 177,555
4 Claims. (Cl. 299—84)

This invention relates to a boring head mechanism and more particularly to a rotary core cutting head mechanism for forming a bore in a mine vein and having improved core cutting means for cutting concentric kerfs in the mine vein to form concentric mineral-cores.

In bore miners of the character such as those disclosed in my copending applications Serial No. 859,038, filed December 11, 1959 and Serial No. 73,244 filed December 2, 1960, both now abandoned, a bore is formed in a mine vein under control from a remote point, and since continuous cuts are made to a depth of approximately 1000', it is desirable to eliminate any need for frequent changing of the cutter bits. In other words the operator controlling the miner never goes into the bore in the mine vein and the miner must be withdrawn from the bore in order to obtain access to the boring heads in order to change cutters. It has been mound under actual mining conditions that the bit points become dull in about 300' of cutting so that in a 100' cut the miner must be withdrawn from the working face of the bore several times in order to change dull cutters.

The present invention contemplates improvements over previous known bore miners in that the cutter arms of the rotary boring heads have marginal guideways along which continuously moving kerf cutter means are circulated thereby enabling the use of numerous cutter bits and eliminating any need for frequent repositioning or changing of cutter bits as cutting progresses. Each boring head has radial arms carrying parallel longitudinally and forwardly extending cutter portions having marginal guideways along which endless cutter chains are orbitally circulated, and as the head revolves the cutter chains cut concentric kerfs in the mine vein thereby forming a core or cores of mineral which are dislodged as cutting proceeds.

It is therefore a primary object of the present invention to provide an improved boring head mechanism. Another object is to provide an improved kerf cutting head mechanism having improved continuously moving kerf cutter means for forming concentric kerfs in a mine vein. Yet another object is to provide an improved rotary boring head having radial arms carrying forwardly extending cutter portions in the head periphery, said cutting portions and radial arms having marginal guideways along which an endless kerf cutting cutter chain is continuously circulated during the boring operation. A further object is to provide improved driving means for the endless cutter chain of the boring head comprising a drive sprocket coaxial with the boring head engaging and driving the endless cutter chain orbitally to circulate the latter at a much higher speed than the speed of rotation of the boring head. A still further object is to provide an improved boring head mechanism comprising cooperating rotary boring heads rotating on parallel horizontal axes in relatively opposite directions for cutting parallel overlapping bores in a mine vein and having improved continuously operating kerf cutter means carried by the heads and movably guided thereon for forming concentric kerfs in the mineral to provide concentric mineral-cores. These and other objects and advantages of the invention will, however, hereinafter more fully appear.

In the accompanying drawings there are shown for purposes of illustration one form and modification which the invention may assume in practice.

Figure 1:
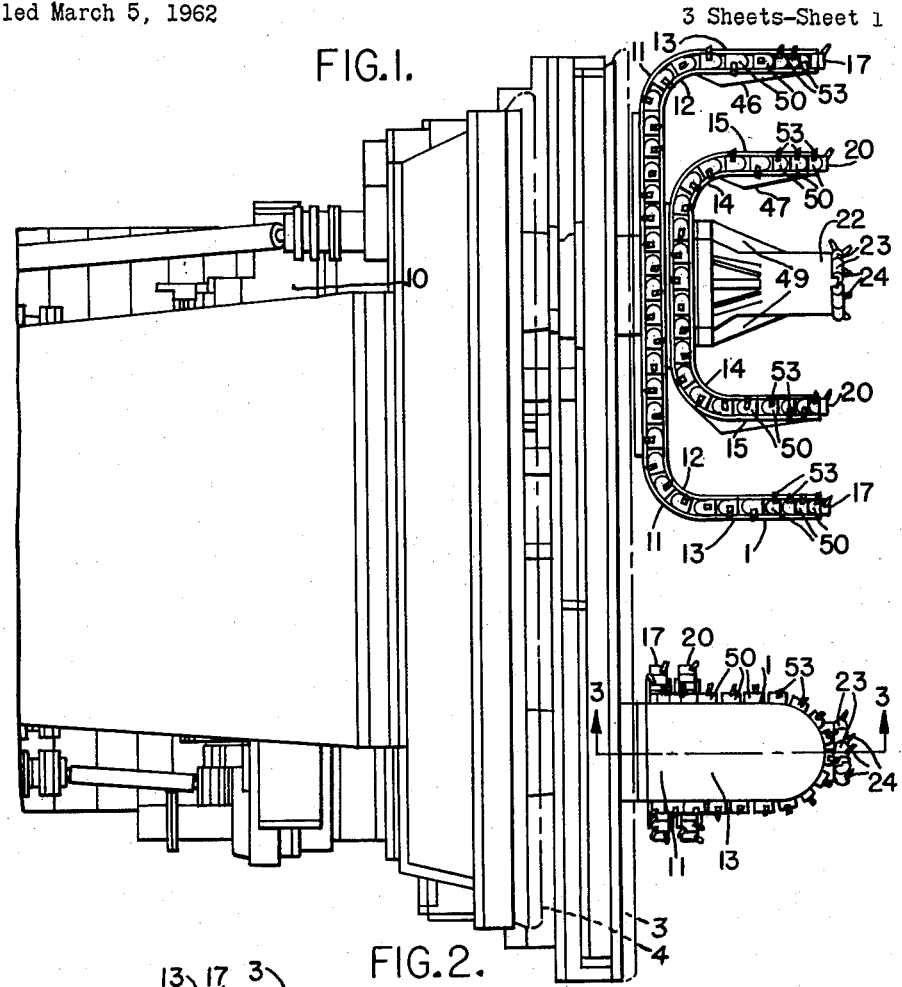
FIG. 1 is a fragmentary plan view of the forward portion of a bore miner having coacting rotary boring heads and in which a preferred illustrative form of the invention is embodied.
Figure 2:
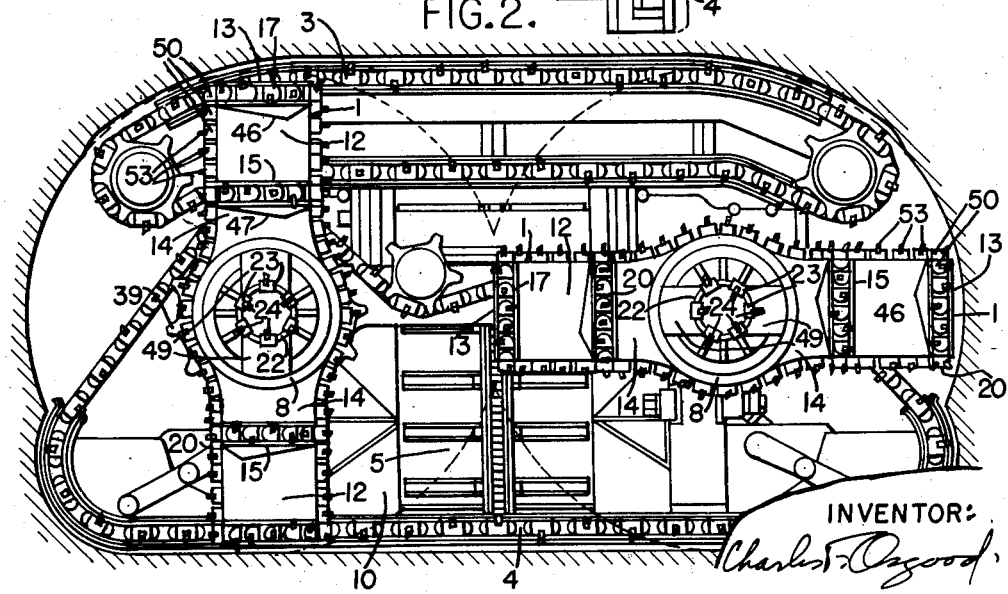
FIG. 2 is a front end view of the bore miner shown in FIG. 1, showing the coacting boring heads.

The bore miner, as stated above, may be similar to that disclosed in either of the copending applications above mentioned but, in this instance, is like the "Joy Twin Borer" disclosed in a copending application Serial No. 479,933, filed January 5, 1955, now Patent No. 3,110,482, assigned to the assignee of the present invention. This bore miner has oppositely rotating boring heads 1 and 2 arranged on parallel horizontal axes for forming parallel overlapping bores in a mine vein, and the triangular cusps left at the floor and roof between the bores are removed by a top endless chain cutter 3 and a bottom endless chain cutter 4, so that a mine passageway of generally oval cross section is provided into which the bore miner moves as cutting proceeds. The mineral dislodged by the boring heads during the boring operation is received by a conventional flight conveyor 5 which conveys the loose mineral away from the working face to a convenient remote point of discharge, in a well known manner. The boring heads, as disclosed in the above mentioned copending application Serial No. 479,933, are driven in an out-of-step relation so that the cutter-carrying arms of one do not interfere with the cutter-carrying arms of the other as the heads rotate. In this "Twin Borer" miner of the pending application last referred to the cutter arms of the boring heads carry a relatively small number of rigidly mounted cutters and since only a relatively few cutters are present frequent time-consuming replacement of dull cutters has been found to be necessary.

Now referring to the improved boring head structure and more particularly to the continuously moving kerf cutting means guided on the heads it will be noted that the heads are substantially identical in design and therefore a description of one will suffice for both. Each boring head has a rotating hub 8 secured to a large longitudinally extending horizontal drive shaft 9 suitably mounted on the body 10 of the miner. Extending radially from the opposite sides of the hub are rearwardly located radial arms 11 having curved outer portions 12 carrying forwardly extending horizontal cutter portions 13 at the head periphery. The cutter portions 13 extend longitudinally in substantial parallelism with the axis of head rotation and normal to the axes of radial arms 11. Outwardly curved portions 14 extend forwardly from the hub 8 in advance of the rear arms 11 and support parallel forwardly and longitudinally extending cutter portions 15 arranged radially inwardly of the outer peripheral cutter portions 13.

The cutter portions 13 and the outer sides or marginal edges of the radial arms 11 are provided with guideways 16 and an endless cutter bit carrying cutter chain 17 is guided for orbital circulation along these guideways and along the sides of the hub 8 into driven engagement with a chain sprocket 18 suitably journaled with the head-hub and arranged coaxial with the boring head. Herein desirably formed integral with the chain sprocket 18 is a similar forwardly located chain sprocket 19 which engages and drives an endless cutter chain 20 guided along guideways 21 at the sides or marginal edges of the curved portions 14 and cutter carrying portions 15 of the forwardly located inner cutter. Arranged centrally of the boring head and secured to the hub 8 for rotation therewith is a pilot core cutter or pilot drill 22 having cutter supports 23 secured thereto and these cutter supports carry detachable cutter bits 24. The core cutter 22 has a central opening 25 communicating with a lateral discharge passage 26 and the core formed by the central core cutter is received within the opening 25 and is broken off as by a wedge surface 27 and deflected laterally through the discharge passage 26.

The dual chain sprocket structure 18, 19 is driven by a drive shaft 30 extending axially within the head-shaft 9 and a spur pinion 27 secured to the shaft 30 meshes with and drives spur gears 32, herein desirably three in number, journaled on stub shafts 33 suitably supported within the hub 8 of the boring head. The forward portions of the shafts 33 extend within openings in a front plate 34 detachably secured, as by screws 35, to the hub body. The central pilot bit or core cutter 22 desirably has its body attached to this hub plate as by screws 36. The spur gears 32 mesh with and drive an internal gear 37 formed on the hub 38 of the chain sprockets 18 and 19.

When each shaft 9 is rotated each boring head is driven at a relatively slow boring speed and the dual chain sprockets engage the cutter chains to drive the latter at a relatively high kerf cutting speed through the shaft 30, the spur pinion 31, spur gears 32 and the internal gear 37. The shafts 9 and 30 may be driven in any suitable manner as by the motor of the bore miner. See the above mentioned copending application Serial No. 479,933 wherein such a driving arrangement is shown and described. Secured to one of the hubs of the boring head is a large chain sprocket 39 (FIG. 3) which, as disclosed, in copending application Serial No. 479,933, drives the bottom trim chain 4.

Figure 3:
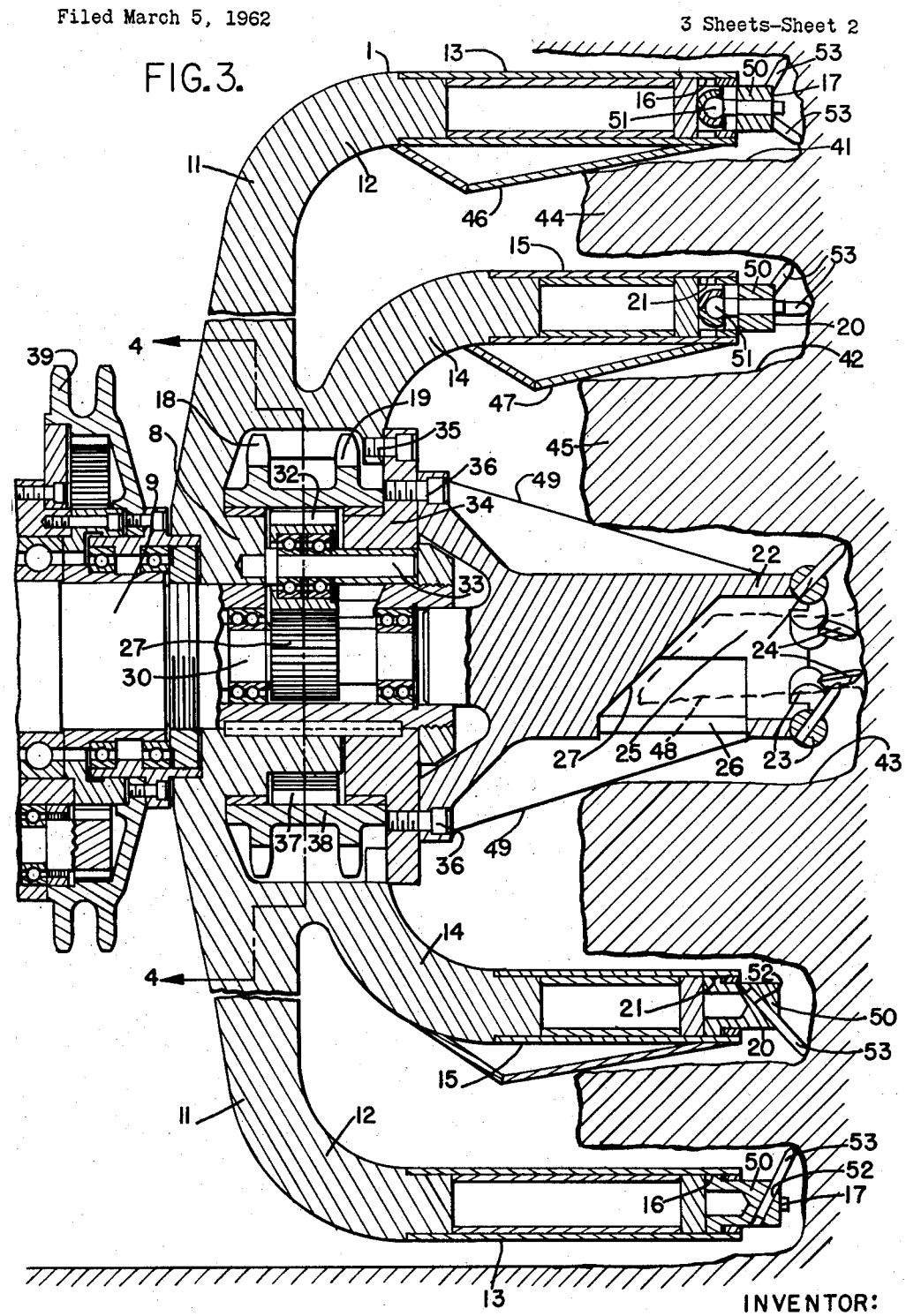
FIG. 3 is an enlarged axial section taken on line 3—3 of FIG. 1, showing details of one of the improved boring heads and illustrating the improved continuously moving kerf cutter means and the drive therefor.

As the bore miner is advanced toward the work with the boring heads rotating and the endless chain cutters driven, concentric kerfs 41 and 42 are cut in the mineral of the mine vein and concurrently the central core cutter 22 forms a pilot bore 43. The concentric cores 44 and 45 of mineral formed by the chain cuttters are dislodged in any suitable manner herein desirably by wedges 46, 47 secured to the inner sides of the parallel cutter portions 13 and 15, as shown in FIG. 3. The motor driven shafts 9 effect rotation of the boring heads in relatively opposite directions at a relatively slow speed and the motor driven shafts 30 effect drive, through the reduction gears, of the endless cutter chains 17 and 20 at a relatively high speed. A central core 48 cut by the central core cutter 22, as stated above, is received within the central opening 25 and broken off and deflected laterally by the wedging surface 27 and discharge through the lateral discharge passage 26. The central pilot cutter may have outer wedging surfaces 49 which aid in dislodging the inner annular mineral-core 45.

While the cutter bars are herein integrally rigidly connected, evidently separate cutter bars may be provided and, as usual in endless cutter chains, suitable adjusting devices may be provided for varying the tension of the cutter chains. Also, in lieu of the dual drive sprocket 18, 19 separate drive sprockets may be mounted and driven in any suitable manner.

Figure 4:
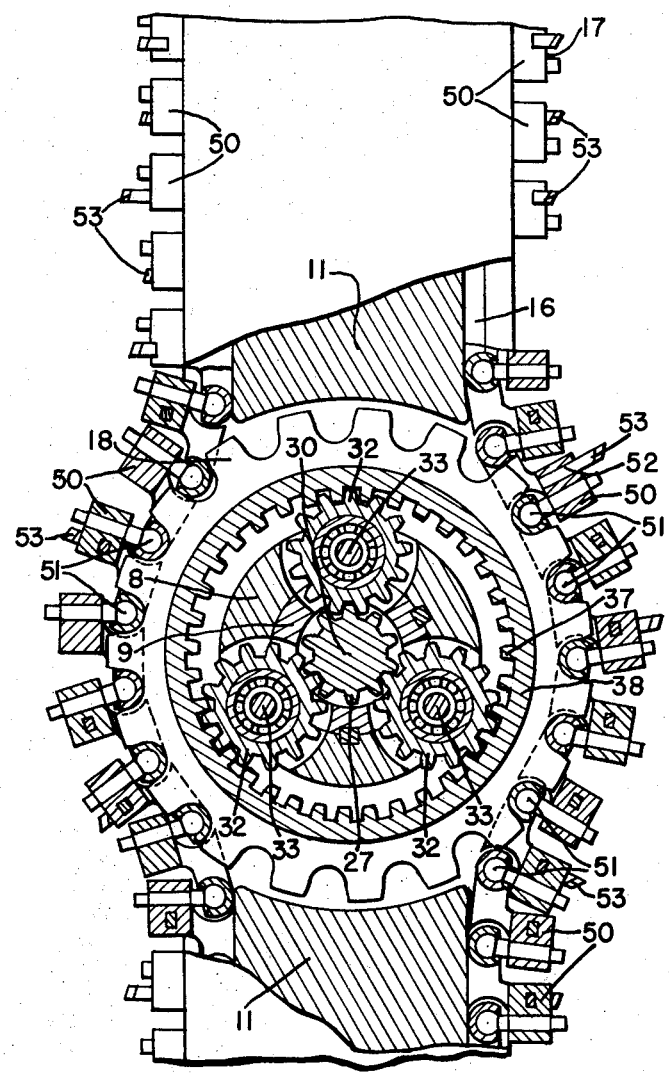
FIG. 4 is a fragmentary cross section taken on the line 4—4 of FIG. 3, showing details of the drive for one of the improved kerf cutting means.
Figure 5:
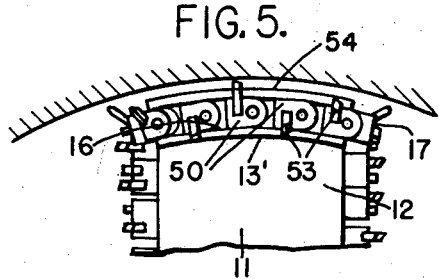
FIG. 5 is a fragmentary, somewhat schematic, view of a modified form of cutter arm structure.

The endless cutter chains are of the well known universal type capable of flexure in angularly related planes and are herein desirably of the Hoy "Multicut" type disclosed in Patent No. 2,675,219, dated April 13, 1954. The chain blocks 50 are universally pivotally connected by ball and socket joints 51 (FIG. 4) and each block has a socket 52 which receives the chain of a conventional detachable cutter bit 53. Further, it will be noted that the shapes and arrangement of the cutter bars or chain guides may be varied and under certain conditions continuously moving cutters other than endless chain kerf cutters may be employed. The cutter portions 13' may be curved, as at 54, to conform with the orbital radii of the boring heads, as shown in FIG. 5, instead of being plane as in the earlier form.

As a result of this invention an improved boring head machine is provided having improved continuously moving kerf cutting means embodying numerous cutting elements whereby any need for frequently changing or repositioning dull cutting points is eliminated. By the provision of the rotary boring heads each having parallel longitudinally and forwardly extending cutter portions provided with marginal guideways for guiding endless cutter chains the circular kerf cutting operation is materially improved. The novel cutter guide or bar arrangement and the endless orbitally moving cutter chains enable cutting of concentric kerfs to form concentric mineral-cores in the mine vein in a more effective manner and due to the provision of numerous successively active cutting elements wear of the cutters is widely distributed and therefore substantially reduced overall. By the provision of the improved driving means both for the boring heads and for the cutter chains the cutter heads are relatively slowly rotated while the cutter chains are circulated in their orbits at a relatively high speed. Not only is compactness and simplicity in design afforded but also ruggedness and efficiency in operation are obtained resulting in a boring structure well adapted to meet the demands of service. These and other advantages of the invention will be clearly apparent to those skilled in the art.

While there are in this application specifically described one form and a modification which the invention may assume in practice, it will be understood that this form and modification of the same are shown for purposes of illustration and that the invention may be further modified and embodied in various other forms without departing from its spirit or the scope of the appended claims.

What I claim is:

1. In a bore mining apparatus, a rotating boring head for cutting a circular kerf in a mine vein and having a rotatable hub, radially extending arms having outer cutter portions at the head periphery, said outer cutter portions extending longitudinally and forwardly in parallelism with the head axis, said arms and cutter portions having marginal guideways, an endless cutter chain guided on said head for circulating orbitally along said guideways, a drive sprocket coaxial with said head and engaging said chain for circulating the latter in its orbit as said head rotates, and means for rotating said head at a substantially slower speed than said sprocket.

2. In a bore mining apparatus, a rotating boring head for cutting a circular kerf in a mine vein and having a rotatable hub, radially extending arms having outer cutter portions at the head periphery, said outer cutter portions extending longitudinally and forwardly in parallelism with the head axis, said arms and cutter portions having marginal guideways, an endless cutter chain guided on said head for circulating orbitally along said guideways, a drive sprocket coaxial with said head and engaging said chain for circulating the latter in its orbit as said head rotates, and means for rotating said head at a substantially slower speed than said sprocket, said boring head having a central drilling cutter coaxial with said chain drive sprocket and extending in advance of the latter.

3. In a mining apparatus, a rotary boring head for cutting a circular kerf in a mine vein and having a hub, radial arms and longitudinally extending cutter portions at the outer portions of said arms and disposed in parallelism with the axis of head rotation, said arms and said cutter portions having marginal guiding means, endless kerf cutter means for guided circulation on said head and moving along the guiding means of said arms and said cutter portions, and a driving element coaxial with and rotatable relative to said head engaging and driving said endless cutter means whereby the latter is circulated relative to said head as the latter rotates.

4. A rotatable core cutting means for cutting a core of mineral from a solid mine vein, comprising a rotatable head, means for rotating said head at a relatively slow speed, endless cutter means guided on said head for orbital circulation relative thereto, said head having projecting peripheral portions extending forwardly and along which said cutter means is guided to effect cutting of a circular kerf in the mine vein as the head rotates, and means for driving said endless cutter means at a relatively high speed, said driving means for said cutter means including a drive member coaxial with and rotatable relative to said head and engaging said endless cutter means at points intermediate the portions thereof guided on said peripheral cutter portions.

References Cited in the file of this patent
UNITED STATES PATENTS

| | | |
|---|---|---|
| 1,826,396 | Gault | Oct. 6, 1931 |
| 2,653,794 | Straitiff | Sept. 29, 1953 |
| 2,850,272 | Joy | Sept. 2, 1958 |